(12) United States Patent
Burke et al.

(10) Patent No.: US 10,825,306 B2
(45) Date of Patent: Nov. 3, 2020

(54) ADJUSTABLE POCKET DEVICE FOR NOTE DISPENSING AND RECEIVING

(71) Applicant: NCR Corporation, Atlanta, GA (US)

(72) Inventors: Gordon Burke, Angus (GB); Scott Cruickshanks, Fife (GB)

(73) Assignee: NCR Corporation, Atlanta, GA (US)

( * ) Notice: Subject to any disclaimer, the term of this patent is extended or adjusted under 35 U.S.C. 154(b) by 116 days.

(21) Appl. No.: 16/119,705

(22) Filed: Aug. 31, 2018

(65) Prior Publication Data

US 2020/0074815 A1  Mar. 5, 2020

(51) Int. Cl.
  *G07F 19/00* (2006.01)
  *G06Q 20/10* (2012.01)
  *G06Q 20/18* (2012.01)
  *G07D 11/14* (2019.01)

(52) U.S. Cl.
  CPC ....... *G07F 19/203* (2013.01); *G06Q 20/1085* (2013.01); *G06Q 20/18* (2013.01)

(58) Field of Classification Search
  CPC ... G07F 19/203; G06Q 20/1085; G06Q 20/18
  See application file for complete search history.

(56) References Cited

U.S. PATENT DOCUMENTS

| | | | | |
|---|---|---|---|---|
| 2007/0034683 A1* | 2/2007 | Eastman | ................. | G07F 1/041 235/379 |
| 2014/0131163 A1* | 5/2014 | Yun | ....................... | G07F 19/202 194/206 |
| 2014/0209435 A1* | 7/2014 | Carlisle | .................... | G07F 19/20 198/604 |
| 2017/0011579 A1* | 1/2017 | Akagi | ...................... | B65H 7/02 |

* cited by examiner

*Primary Examiner* — Laura A Gudorf
(74) *Attorney, Agent, or Firm* — Schwegman, Lundberg & Woessner

(57) ABSTRACT

Various embodiments herein include a pocket to receive tendered notes and to dispense notes from a terminal, such as an automated teller machine. The pocket may include a shutter, a lifter opposite the shutter, a pusher plate between and perpendicular to the shutter and lifter, and a ceiling clamp. The pocket also includes a controller that causes the terminal to perform actions when dispensing notes including moving the ceiling clamp to an open position and providing an output triggering dispensing of notes into the pocket. The actions further include moving the ceiling clamp to a closed position, moving the pusher plate to bias notes present within the pocket against the ceiling clamp and raising the lifter from a lower position to an upper position thereby lifting notes present between the pusher plate and the ceiling clamp. The shutter is then opened to expose and dispense the notes.

23 Claims, 8 Drawing Sheets

ADJUSTABLE POCKET DEVICE FOR NOTE DISPENSING AND RECEIVING

BACKGROUND

In self-service terminals, note dispensing and receiving pockets present convenience to customers by allowing them to place a bundle of notes in the pocket for deposit without use of an envelope. Pockets also allow for tendering and presenting notes to customers with mitigated environmental risks, such as wind blowing notes around. Pockets can also conceal notes that are tendered and dispensed to help with customer security. However, experience has shown that some customers are reluctant to put their hand inside the cavity of a pocket out of concern a shutter may close thereon. Further, certain terminal placements present accessibility concerns as the inside of the pocket, and even the pocket in the entirety, may not be visible (i.e., when seated in a wheelchair). Thus, despite the benefits provided at terminals by pockets, current pockets present other issues for at least some customers.

SUMMARY

Various embodiments herein include a pocket to receive tendered notes and to dispense notes from a terminal, such as an automated teller machine. The pocket may include a shutter, a lifter opposite the shutter, a pusher plate between and perpendicular to the shutter and lifter, and a ceiling clamp. The pocket also includes a controller that causes the terminal to perform actions when dispensing notes including moving the ceiling clamp to an open position and providing an output triggering dispensing of notes into the pocket. The actions further include moving the ceiling clamp to a closed position, moving the pusher plate to bias notes present within the pocket against the ceiling clamp and raising the lifter from a lower position to an upper position thereby lifting notes present between the pusher plate and the ceiling clamp. The shutter is then opened to expose and dispense the notes.

BRIEF DESCRIPTION OF THE FIGURES

The above-mentioned and other features and advantages of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention any manner.

DETAILED DESCRIPTION

Figure 1:
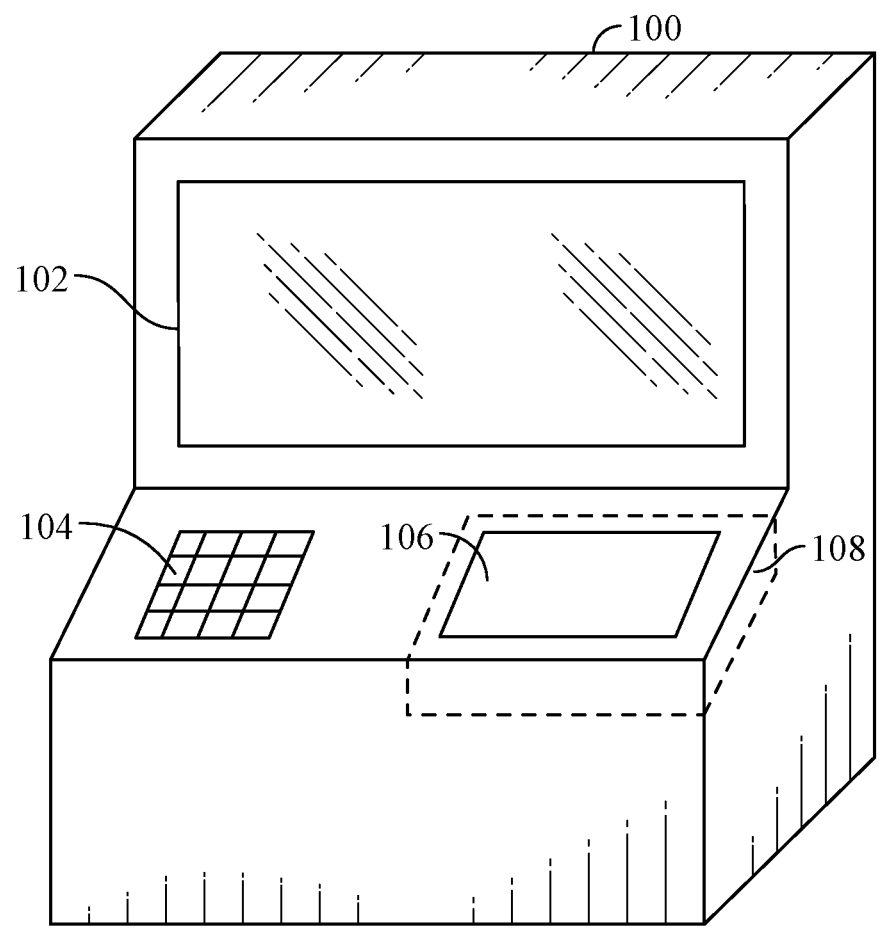
FIG. 1 is an illustration of an ATM consistent with embodiments disclosed herein.

The following detailed description refers to the accompanying drawings. Wherever possible, the same reference numbers are used in the drawings and the following description to refer to the same or similar elements. While embodiments and examples are described, modifications, adaptations, and other implementations are possible. For example, substitutions, additions, or modifications may be made to the elements and stages illustrated in the drawings, and the systems and methods described herein may be modified by substituting, reordering, or adding stages to the disclosed methods or elements to the disclosed systems. Accordingly, the following detailed description does not limit this disclosure. Instead, the proper scope of any invention disclosed herein is defined by the appended claims.

Terminals, such as automated teller machines (ATMs), self-service checkouts (SSCOs), and other self-service terminals (SSTs) that utilize currency recyclers often include a pocket, or cavity, within which notes are received and dispensed, such as ATM deposits and withdrawals, respectively. Note visibility and protrusion are strong predictors of customer usability as visibility enables customers of all eye-heights to know notes have been dispensed and protrusion allows all people to grasp the notes. At the same time, protrusion prevents customers from having to insert a hand inside the cavity as discussed herein.

The various embodiments illustrated and described herein present an adjustable pocket device for note dispensing and receiving and methods of operation thereof.

The functions or algorithms that control operation of the terminals and associated devices therein including the adjustable pocket device for note dispensing and receiving described herein are implemented in hardware, software or a combination of software and hardware in one or more embodiments. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

FIG. 1 is an illustration of an ATM 100, according to an example embodiment. The ATM 100 is provided as an example of a terminal that includes a picker and stacker unit 108 within which notes, such as currency and checks, may be deposited and dispense by a terminal. The ATM includes an input device, such as a display 102, a Personal Identification Number (PIN) pad 104 input device, and the like. The picking and stacking unit 108 in the embodiments disclosed herein generally includes a pocket 106 within which notes may be placed when tendered without being within an envelope as with traditional ATMs and other terminals. Notes may also be picked into the pocket 106 for dispensing. The pocket 106 may be present and located within the picker and stacker unit 108 and thereby also the ATM 100 do minimize area consumed by deposit and dispensing locations where the display 102 is otherwise located. This allows the display 102 to be larger to provide greater accessibility options and ability, such as for the sight-challenged. The pocket 106 may also be located in some embodiments to provide greater reach and viewing to increase accessibility for the wheelchair bound, among others.

Figure 2:
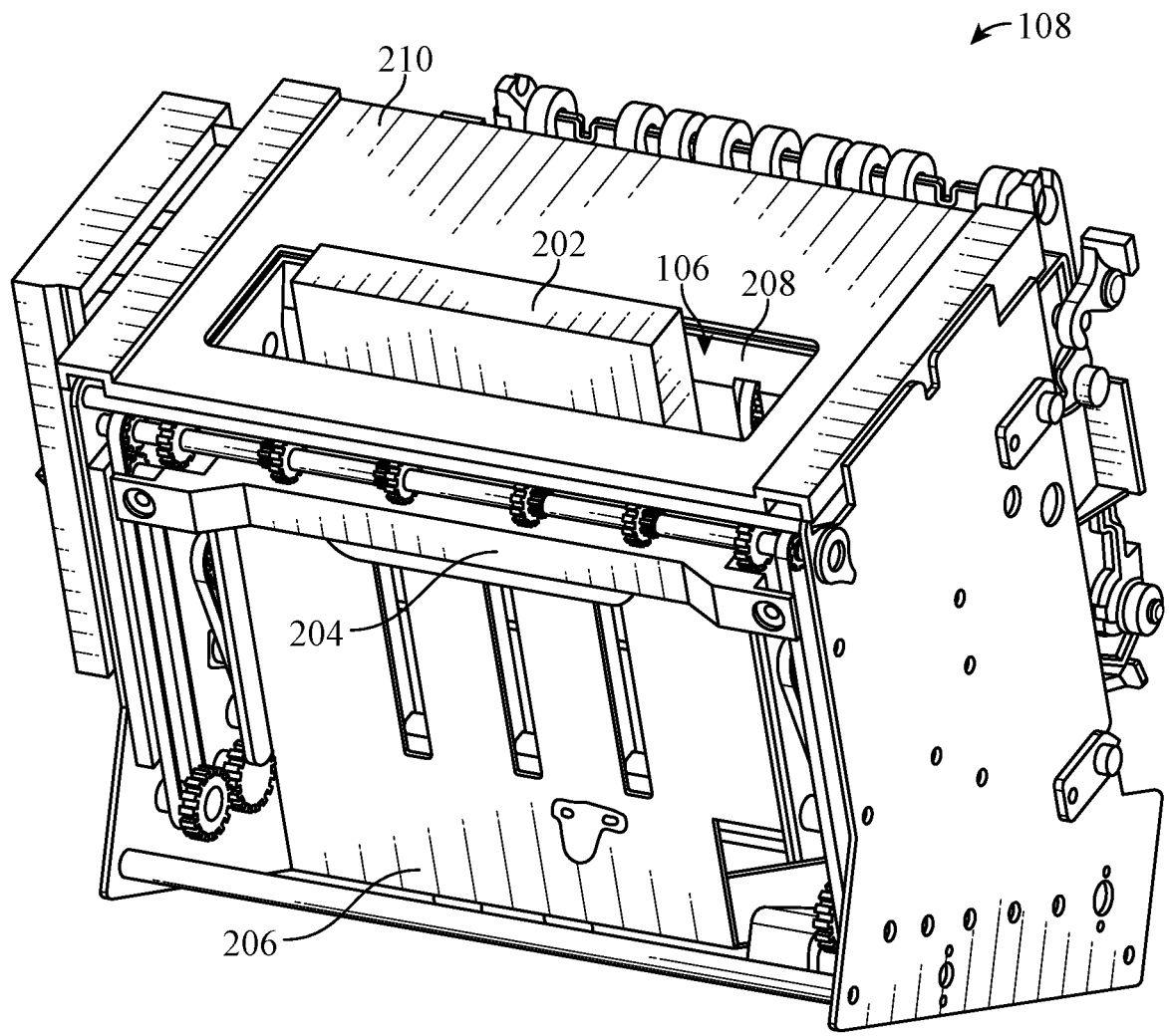
FIG. 2 is a perspective view of a terminal picker and stacker unit consistent with embodiments disclosed herein.

FIG. 2 is a perspective view of a terminal picker and stacker unit 108 consistent with embodiments disclosed herein. The pocket 106 is present within the terminal picker and stacker unit 108 and is adjustable in size to manipulate notes that are placed therein. The pocket 108 has a base formed by a lifter 204, opposing sidewalls formed by a pusher plate 206 and a ceiling clamp 208, and outside end-walls formed by a housing of the picker and stacking unit 108 or otherwise by elements thereof. The ceiling clamp 208 opens and closes to allow notes to be added to or removed from the pocket 106. When the ceiling clamp 208 is in a closed position, currency present within the pocket 106 may be bunched by operation of the pocket by moving the pusher plate 206 to bias the pusher plate 206 against the ceiling clamp 208 within the notes bunched therebetween to form a note bunch 202. When the picker and stacker unit 108 is performing a dispensing operation, the lifter 204 may then rise, thereby lifting the note bunch 202 up through a top 210 of the pocket 106 once a top shutter (not shown in FIG. 2) has opened. The note bunch 202 is then easily viewable and can be secured by a customer's hand and removed. In some embodiments, the lifter 204 when lifting the note bunch 202 may be assisted or substituted for this lifting operation by belted conveyors (not illustrated) that are present in some embodiments on the surfaces of the ceiling clamp 208 and the pusher plate 206.

Figure 3A:
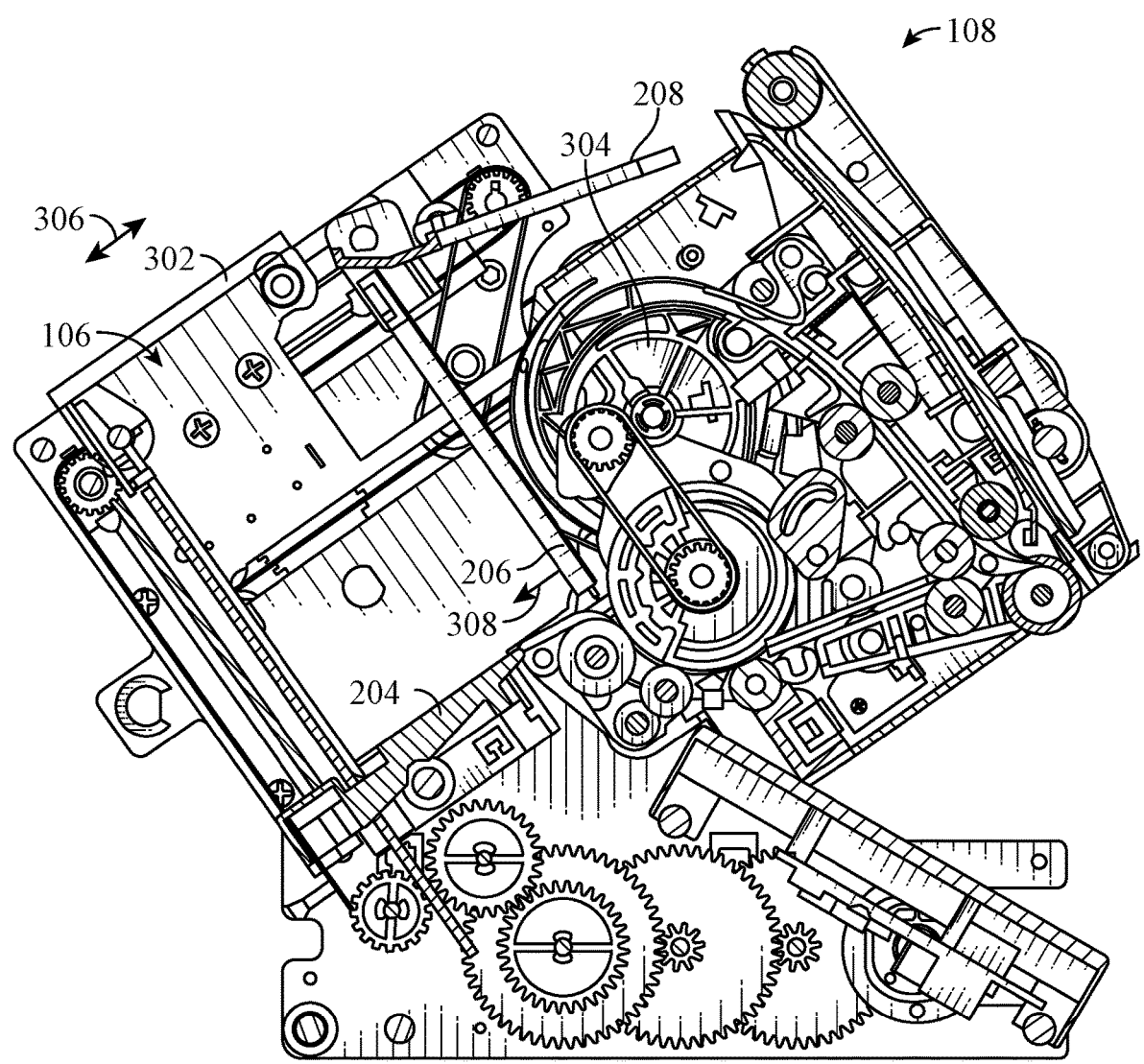
FIGS. 3A, 3B, and 3C are side, internal perspectives of a terminal picking and stacking unit consistent with embodiments disclosed herein.
Figure 3B:
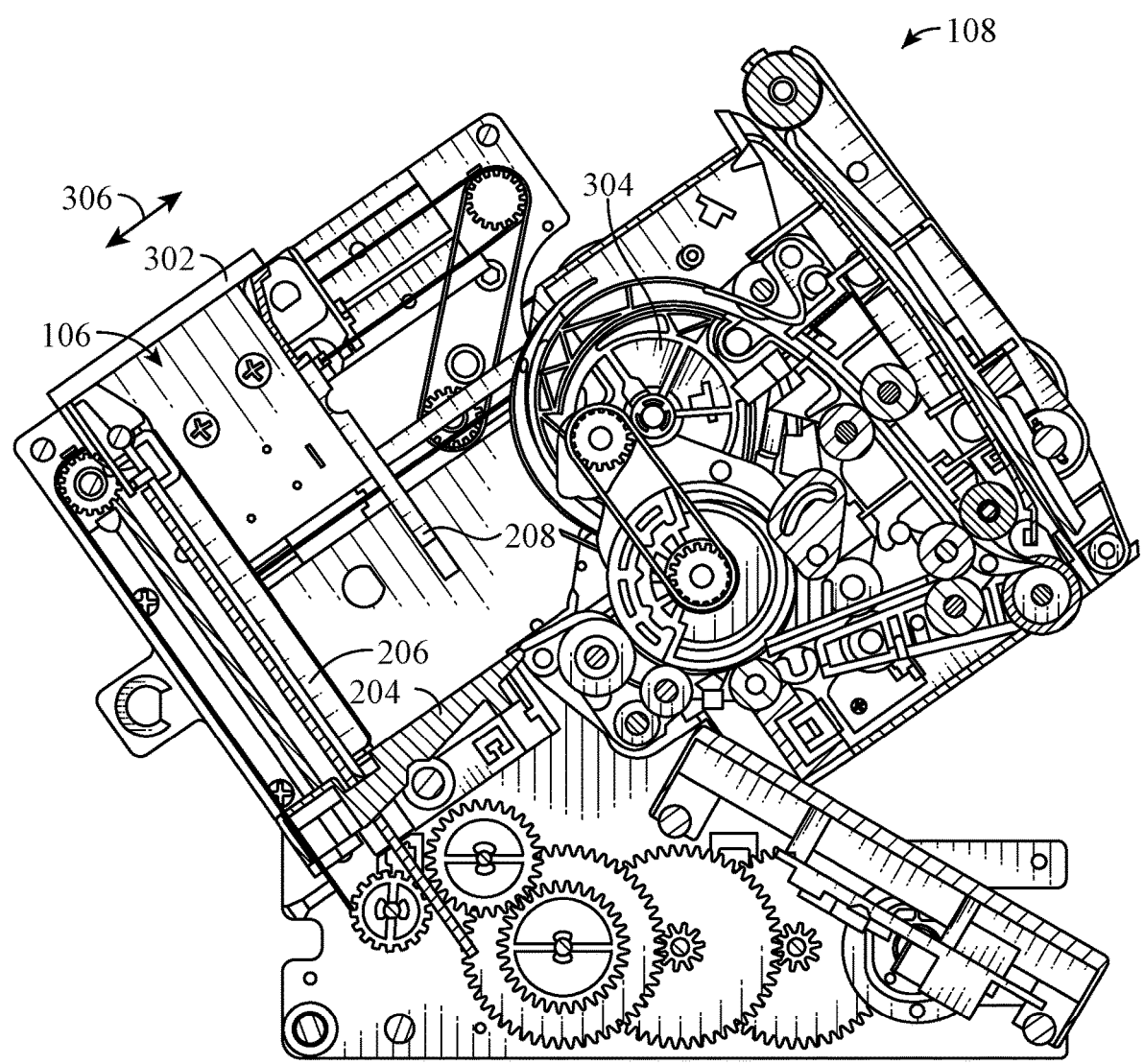
Figure 3C:
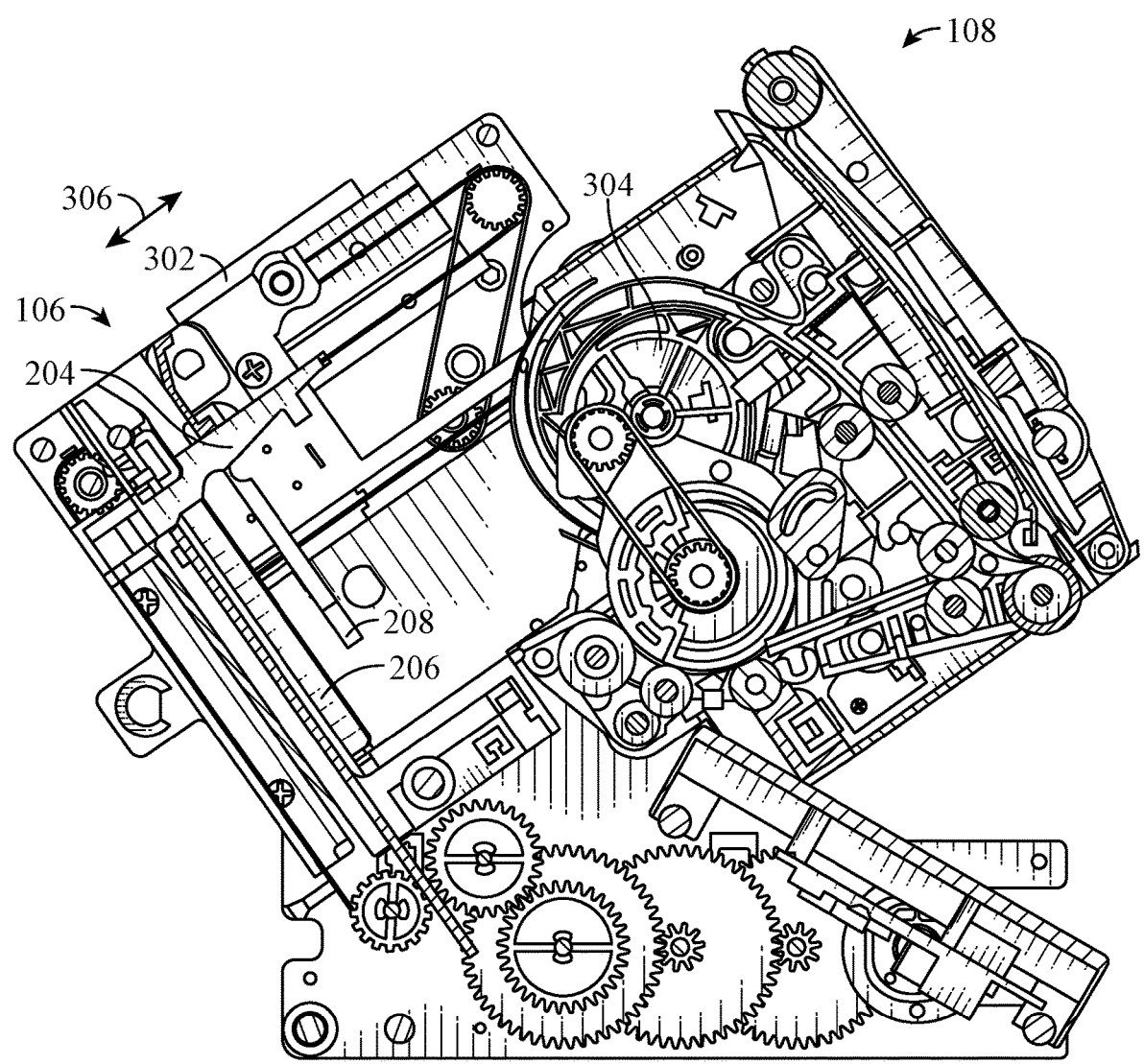

FIGS. 3A, 3B, and 3C are side, internal perspectives of the terminal picking and stacking unit 108 consistent with embodiments disclosed herein. FIGS. 3A, 3B, and 3C include two additional elements not illustrated in FIG. 2. These elements are the shutter 302 that in the illustrated embodiment of FIGS. 3A, 3B, and 3C slides forward and backward as indicated by arrow 306 and a picker and stacker 304. As illustrated in FIGS. 3A and 3B, the shutter 302 is in the forward, closed position. The picker and stacker 304 operates to pick notes from currency cassettes or other currency store in a terminal and place them in the pocket 106. As shown in FIG. 3A, the picker and stacker 304 places the notes on the pusher plate 206, which is in a raised position. As the notes are placed on the pusher plate 206, the pusher plate 206 may lower to a lowered position as indicated by arrow 308 and shown in FIGS. 3B and 3C. Once the notes have been placed on the pusher plate 206, the ceiling clamp 208 may lower from an open position shown in FIG. 3A to a closed position as shown in FIGS. 3B and 3C. Once the ceiling clamp 208 is in the closed position, the ceiling clamp 208 may lower to be in close proximity to the pusher plate 206 and the lifter 204 may move from a rear of the pocket 106 towards an opening of the pocket 106 to present the notes as shown in FIG. 3C.

To receive notes, the ceiling clamp 208 may be in the closed and raised positions as shown in FIG. 3B. The pusher plate 206 may be in the lowered position as shown in FIG. 3B. The lifter 204 may be in a lowered position as shown in FIG. 3B. Once the notes are in the pocket, the ceiling clamp 208 may rotate to the opened position as shown in FIG. 3A and the pusher plate 206 may raise to a position proximate the picker stacker 304 as shown in FIG. 3A so that he picker stacker 304 can remove notes from the pocket 106 and place them in a deposit bin, a recycler bin, or provide the notes to another device for one or more of sorting, stacking, processing, and the like.

Figure 4A:
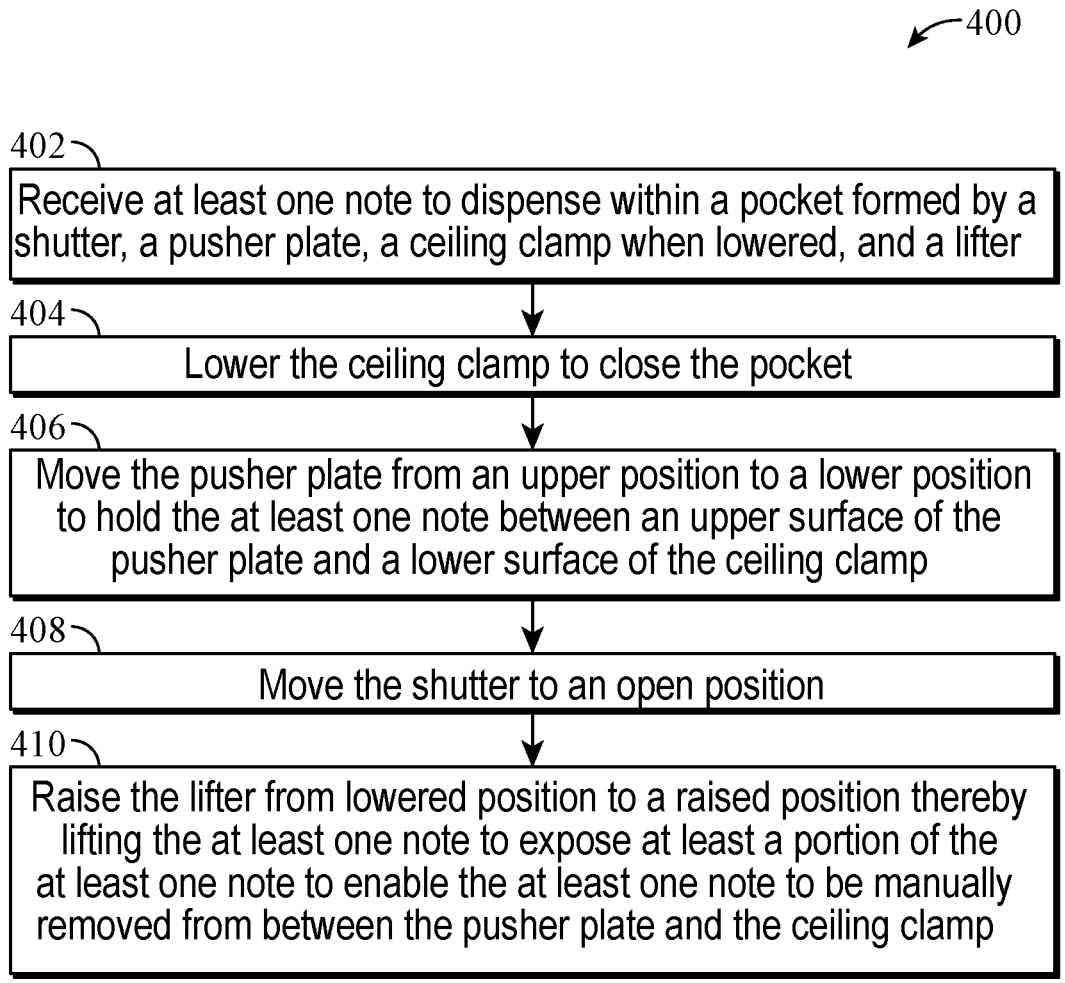
FIGS. 4A and 4B show a block flow diagram of methods consistent with embodiments disclosed herein.

FIG. 4A is a block flow diagram of a method 400, according to an example embodiment. The method 400 is an example of a method that may be performed by a picker and stacker unit, such as picker and stacker unit 108 of FIG. 1 et. seq. under the control of one or more of a picker and stacker unit controller and a computing device controlling operation of a terminal, such as ATM 100, within which the picker and stacker unit is deployed.

The method 400 includes receiving 402 at least one note to dispense within a pocket formed by a shutter, a pusher plate, a ceiling clamp when lowered, and a lifter. The method 400 further includes lowering 404 the ceiling clamp to close the pocket and moving 406 the pusher plate from an upper position to a lower position to hold the at least one note between an upper surface of the pusher plate and a lower surface of the ceiling clamp. The method 400 may then move 408 the shutter to an open position. Subsequently, the method 400 includes raising 410 the lifter from lowered position to a raised position thereby lifting the at least one note to expose at least a portion of the at least one note to enable the at least one note to be manually removed from between the pusher plate and the ceiling clamp. In other embodiments, the lifting is instead or also performed by conveying belts or wheels that disposed on a surface of one or both of the ceiling clamp and pusher plate that are inward facing to the pocket.

In some embodiments of the method 400, lowering 404 the ceiling clamp includes rotating the ceiling clamp along an upper, proximal edge to move an opposite, distal edge to a lower position proximate to the lifter in the lowered position. In another embodiment, a wall of the pocket formed by the ceiling clamp when in the lowered position is instead open when the ceiling clamp is in a raised position. In such embodiments, the wall when open exposes a mechanism that places the at least one note in the pocket. This mechanism that places the at least one note in the pocket is also a note picker to pick notes from the pocket.

Figure 5:
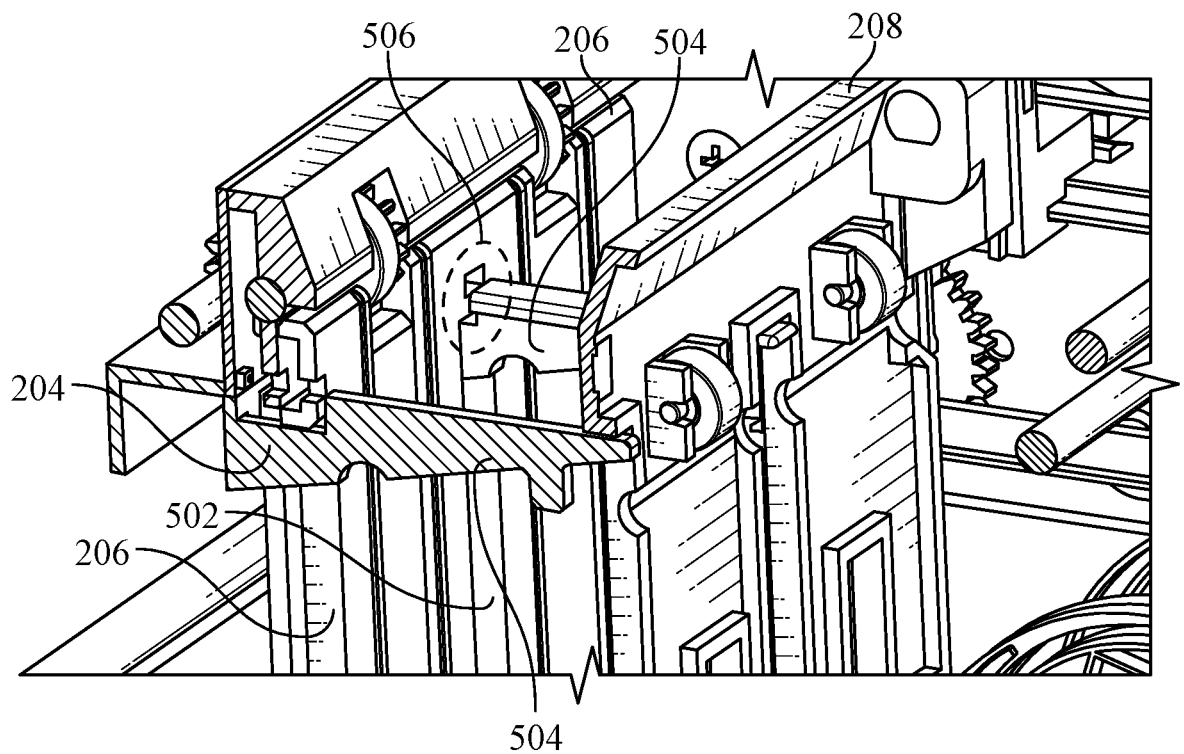
FIG. 5 illustrates a pusher plate consistent with embodiments disclosed herein.

In some other embodiments, the lifter includes a spine along a proximal edge and a plurality of fingers extending outward perpendicularly from the proximal edge with distal ends of the fingers. Also, the pusher plate may define a plural number of voids formed therein that are equal in number and located according to the number and location of the plurality of fingers of the lifter such that the plurality of fingers fit and move within the number of voids when the pusher plate is moved between the lower and upper positions and when the lifter is raised and lowered. FIG. 5 illustrates a pusher plate 206, according to such an example embodiment. For example, as shown in FIG. 5, the pusher plate 206 may define a number of voids 502. The lifter 204 may comprise a plurality of fingers 504 that may pass through the voids 502. The plurality of fingers 504 may define a notch 506 that may allow the fingers 504 to travel further toward the opening of a pocket, thus allowing the notes to be presented a greater distance out of the pocket for easier gripping by a user.

Figure 4B:
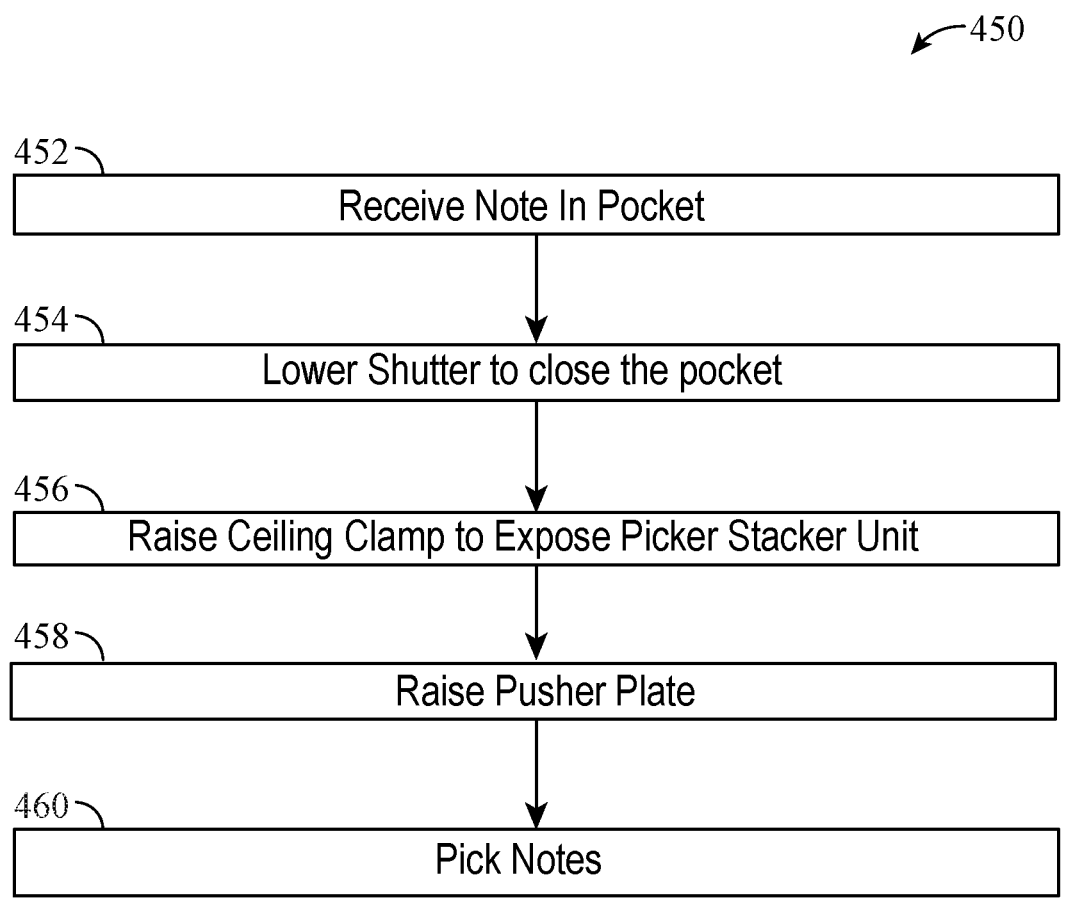

FIG. 4B is a block flow diagram of a method 450, according to an example embodiment. The method 450 is an example of a method that may be performed by a picker and stacker unit, such as picker and stacker unit 108 of FIG. 1 et. seq. under the control of one or more of a picker and stacker unit controller and a computing device controlling operation of a terminal, such as ATM 100, within which the picker and stacker unit is deployed.

The method 450 includes receiving 452 at least one note to within a pocket formed by a shutter, a pusher plate, a ceiling clamp when lowered, and a lifter for deposit within the terminal. The method 450 further includes lowering 454 the shutter to close the pocket and raising 456 the ceiling clamp to expose the picker and stacker unit. Once the picker and stacker unit is exposed, the pusher plate may be raised 458 from a lower position to an upper to bring the notes to the picker and stacker unit. The method 450 may then cause the picker and stacker unit to pick the notes from the pusher plate. Once picked, the notes may be transported to cassettes or other areas of the terminal for storage, recycling, validation, etc.

In some embodiments, the pocket may also include one or both of a light and a camera. When present, the light illuminates when the shutter opens such that a customer may better see inside the pocket. In these and some other embodiment that include a camera, the camera captures a view of the inside of the pocket and that view is presented on a display of the terminal. This view can be when the pocket is open and, in some embodiments, even at some times when the pocket is closed to provide a customer of notes being added to or removed from the pocket.

In some embodiments, as will be discussed later, the shutter may take different forms. As such, opening and closing the shutter may be different in various embodiments, such as rotating the pocket, opening two portions of the pocket to provide easier access or viewing, and the like. Further, in some embodiments, some portions of the pocket may be transparent, such as the shutter and even other areas such as a front lip area, to enable customers to view inside the pocket.

Figure 6:
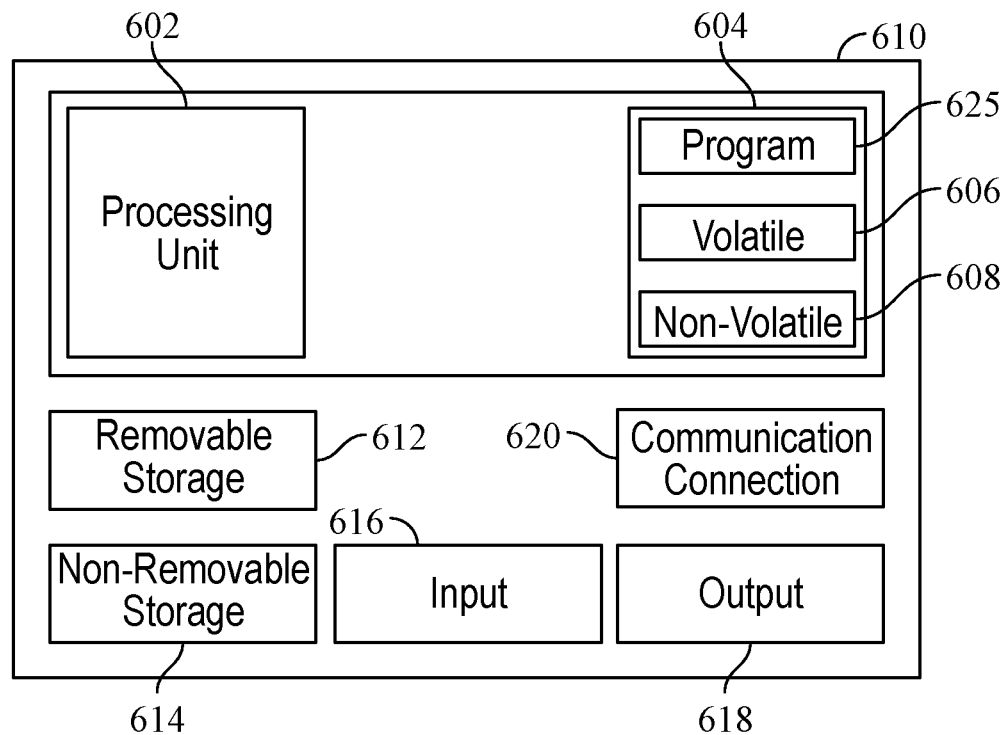
FIG. 6 is a block diagram of a computing device consistent with embodiments disclosed herein.

FIG. 6 is a block diagram of a computing device, according to an example embodiment. The computing device, in some embodiments, is utilized to control operation of a terminal or a portion thereof, such as an ATM or a note and stacking unit 108 of FIG. 1 and elsewhere herein. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 610, may include a processing unit 602, memory 604, removable storage 612, and non-removable storage 614. Although the example computing device is illustrated and described as computer 610, the computing device may be in different forms in different embodiments. For example, the computing device may instead be a smartphone, a tablet, smartwatch, or other computing device including the same or similar elements as illustrated and described with regard to FIG. 6. Devices such as smartphones, tablets, and smartwatches are generally collectively referred to as mobile devices. Further, although the various data storage elements are illustrated as part of the computer 610, the storage may also or alternatively include cloud-based storage accessible via a network, such as the Internet.

Returning to the computer 610, memory 604 may include volatile memory 606 and non-volatile memory 608. Computer 610 may include—or have access to a computing environment that includes a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 610 may include or have access to a computing environment that includes input 616, output 618, and a communication connection 620. The input 616 may include one or more of a touchscreen, touchpad, mouse, keyboard, camera, one or more device-specific buttons, one or more sensors integrated within or coupled via wired or wireless data connections to the computer 610, and other input devices. The computer 610 may operate in a networked environment using a communication connection 620 to connect to one or more remote computers, such as database servers, web servers, and other computing device. An example remote computer may include a personal computer (PC), server, router, network PC, a peer device or other common network node, or the like. The communication connection 620 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 620 may also or alternatively include a transceiver device, such as a BLUETOOTH® device that enables the computer 610 to wirelessly receive data from and transmit data to other BLUETOOTH® devices.

Computer-readable instructions stored on a computer-readable medium are executable by the processing unit 602 of the computer 610. A hard drive (magnetic disk or solid state), CD-ROM, and RAM are some examples of articles including a non-transitory computer-readable medium. For example, various computer programs 625 or apps, such as one or more applications and modules implementing one or more of the methods illustrated and described herein or an app or application that executes on a mobile device or is accessible via a web browser, may be stored on a non-transitory computer-readable medium.

EXAMPLES

Example 1 is a method comprising: receiving at least one note to dispense within a pocket formed by a shutter, a pusher plate, a ceiling clamp when lowered, and a lifter; moving the pusher plate from an upper position to a lowered position to hold the at least one note between an upper surface of the pusher plate and a lower surface of the ceiling clamp; and raising the lifter from a lowered position to a raised position thereby lifting the at least one note to expose at least a portion of the at least one note to enable the at least one note to be manually removed from between the pusher plate and the ceiling clamp.

In Example 2, the subject matter of Example 1 optionally includes wherein: the at least one note includes a first plurality of notes having a first denomination or a second plurality of notes having a second denomination, and raising the lifter from the lowered position to the raised position includes raising the lifter a first distance for a first denomination or raising the lifter a second distance for the second denomination.

In Example 3, the subject matter of any one or more of Examples 1-2 optionally include wherein raising the lifter from the lowered position to the raised position includes raising the lifter a predetermined distance that corresponds to a width of one of the at least one note.

In Example 4, the subject matter of any one or more of Examples 1-3 optionally include lowering the ceiling clamp by rotating the ceiling clamp along an upper, proximal edge to move an opposite, distal edge to a lower position proximate to the lifter in the lowered position.

In Example 5, the subject matter of any one or more of Examples 1-4 optionally include wherein a wall of the pocket formed by the ceiling clamp when in the lowered position is instead open when the ceiling clamp is in a raised position, the wall when open exposes a mechanism that places the at least one note in the pocket.

In Example 6, the subject matter of Example 5 optionally includes wherein the mechanism that places the at least one note in the pocket is also a note picker to pick notes from the pocket.

In Example 7, the subject matter of any one or more of Examples 1-6 optionally include wherein: the lifter includes a spine along a proximal edge and a plurality of fingers extending outward perpendicularly from the proximal edge with distal ends of the fingers; and the pusher plate defines a plurality of openings that are equal in number and located according to the number and location of the plurality of fingers of the lifter such that the plurality of fingers fit and move within the number of voids when the pusher plate is moved between the lower and upper positions and when the lifter is raised and lowered.

In Example 8, the subject matter of any one or more of Examples 1-7 optionally include moving the shutter to an open position; and illuminating the pocket when the shutter is in the open position.

In Example 9, the subject matter of Example 8 optionally includes wherein moving the shutter to the open position includes rotating the pocket to an outwardly exposed position.

In Example 10, the subject matter of any one or more of Examples 1-9 optionally include wherein the method is performed by a self-service terminal (SST).

In Example 11, the subject matter of Example 10 optionally includes wherein the SST is an automated teller machine (ATM).

In Example 12, the subject matter of any one or more of Examples 1-11 optionally include wherein the at least one note is a currency note.

Example 13 is a self-service terminal comprising: a note dispensing and picking mechanism configured to insert notes into a pocket and remove notes from the pocket; a shutter forming an upper surface of the pocket that exposes an inside of the pocket outwardly from the self-service terminal when the shutter is in an open position; a lifter positioned opposite the shutter and forming a lower surface of the pocket; a pusher plate located in between the shutter and lifter forming a first surface of the pocket; a ceiling clamp located opposite the pusher plate and in between the shutter and lifter forming a second surface of the pocket when in a closed position, the ceiling clamp exposing an inside of the pocket to the note dispensing and picking mechanism when in an open position; and a controller to control operation of the pocket, the controller when dispensing notes operable to cause the self-service terminal to perform actions comprising: moving the ceiling clamp to the open position; providing an output indicating the pocket is in the open position such that the note dispensing and picking mechanism can then dispense notes into the pocket; moving the ceiling clamp to the closed position; moving the pusher plate reward as the notes are dispensed into the pocket such that secure notes present within the pocket are biased against the ceiling clamp; raising the lifter from a lower position to an upper position thereby lifting notes present within the pocket between the pusher plate and the ceiling clamp; and opening the shutter to expose the notes present within the pocket to an exterior of the pocket.

In Example 14, the subject matter of Example 13 optionally includes wherein the pusher plate is perpendicular to the shutter and lifter, and the first surface is perpendicular to the lower surface of the pocket.

In Example 15, the subject matter of any one or more of Examples 13-14 optionally include wherein the ceiling clamp is perpendicular to the shutter and lifter when in the closed position, and the second surface is perpendicular to the shutter when the ceiling clamp is in the closed position.

In Example 16, the subject matter of any one or more of Examples 13-15 optionally include wherein the actions further comprise further raising the lifter to expose a portion of the notes within the pocket from between the pusher plate and the ceiling clamp to allow manual removal of the notes within the pocket from therebetween.

In Example 17, the subject matter of any one or more of Examples 13-16 optionally include a light internal to the pocket; and the actions further comprising illuminating the light upon opening the shutter.

In Example 18, the subject matter of Example 17 optionally includes a display device; a camera positioned to capture a view of the inside of the pocket when the shutter is open; and the actions further comprising: capturing images with the camera upon opening and illuminating the light, and providing the images for presentation on the display device.

In Example 19, the subject matter of any one or more of Examples 13-18 optionally include wherein the controller, when controlling operation of the pocket to receive tendered notes, causes the self-service terminal to perform actions comprising: opening the shutter; closing the shutter upon receipt of an indicating notes have been received; moving the pusher plate forward to secure notes present within the pocket with a force biased against the ceiling clamp; moving the ceiling clamp to the open position; and instructing the note dispensing and picking mechanism to pick notes from the pocket.

In Example 20, the subject matter of Example 19 optionally includes wherein the controller, when controlling operation of the pocket to receive tendered notes, causes the self-service terminal to perform actions further comprising: lowering the lifter prior to opening the shutter; and raising the lifter after closing the shutter and before moving the ceiling clamp to the open position.

In Example 21, the subject matter of any one or more of Examples 19-20 optionally include The self-service terminal Example 19, wherein the pocket is oriented such that notes, when placed in or picked from the pocket lay flat upon the pusher plate.

In Example 22, the subject matter of any one or more of Examples 19-21 optionally include wherein at least one received note is a check.

In Example 23, the subject matter of any one or more of Examples 13-22 optionally include wherein the notes include currency notes.

In Example 24, the subject matter of any one or more of Examples 13-23 optionally include wherein the self-service terminal is an automated teller machine (ATM).

Example 25 is a controller for controlling a self-service terminal, the controller operable to cause the self-service terminal to perform actions comprising: moving a ceiling clamp to an open position; providing an output indicating the ceiling clamp is in the open position such that a note dispensing and picking mechanism can then dispense notes into a pocket; moving the ceiling clamp to a closed position; moving a pusher plate reward as the notes are dispensed into the pocket such that secure notes present within the pocket are biased against the ceiling clamp; raising the lifter from a lower position to an upper position thereby lifting notes present within the pocket between the pusher plate and the ceiling clamp; and opening a shutter to expose the notes present within the pocket to an exterior of the pocket.

In Example 26, the subject matter of Example 25 optionally includes wherein the actions further comprise further raising the lifter to expose a portion of the notes present within the pocket from between the pusher plate and the ceiling clamp to allow manual removal of the notes within the pocket from therebetween.

In Example 27, the subject matter of any one or more of Examples 25-26 optionally include wherein the actions further comprise illuminating a light located within the pocket upon opening the shutter.

In Example 28, the subject matter of Example 27 optionally includes wherein the actions further comprise: capturing images with a camera upon opening and illuminating the light, and providing the images for presentation on a display device.

In Example 29, the subject matter of any one or more of Examples 25-28 optionally include wherein the controller, when controlling operation of the self-service terminal to receive tendered notes, causes the self-service terminal to perform actions comprising: opening the shutter; closing the shutter upon receipt of an indicating notes have been received; moving the pusher plate forward to secure notes present within the pocket against the ceiling clamp; moving the ceiling clamp to the open position; and instructing the note dispensing and picking mechanism to pick notes from the pocket.

In Example 30, the subject matter of Example 29 optionally includes wherein the controller, when controlling operation of the pocket to receive tendered notes, causes the self-service terminal to perform actions further comprising: lowering the lifter prior to opening the shutter; and raising the lifter after closing the shutter and before moving the ceiling clamp to the open position.

In Example 31, the subject matter of any one or more of Examples 29-30 optionally include wherein at least one received note is a check.

In Example 32, the subject matter of any one or more of Examples 25-31 optionally include wherein the notes include currency notes.

In Example 33, the subject matter of any one or more of Examples 25-32 optionally include wherein the self-service terminal is an automated teller machine (ATM).

Example 34 is a method comprising: receiving at least one note to dispense within a pocket formed by a shutter, a pusher plate, a ceiling clamp when in a first position, and a lifter; moving the pusher plate from a first position to a second position to hold the at least one note between a first surface of the pusher plate and a first surface of the ceiling clamp; and raising the lifter from a first position to a second position thereby translating the at least one note to expose at least a portion of the at least one note to enable the at least one note to be manually removed from between the pusher plate and the ceiling clamp.

In Example 35, the subject matter of Example 34 optionally includes wherein: the at least one note includes a first plurality of notes having a first denomination or a second plurality of notes having a second denomination, and raising the lifter from the first position to the second position includes raising the lifter a first distance for a first denomination or raising the lifter a second distance for the second denomination.

In Example 36, the subject matter of any one or more of Examples 34-35 optionally include wherein raising the lifter from the first position to the second position includes raising the lifter a predetermined distance that corresponds to a width of one of the at least one note.

In Example 37, the subject matter of any one or more of Examples 34-36 optionally include moving the ceiling clamp by rotating the ceiling clamp along a proximal edge to move an opposite, distal edge to a second position proximate to the lifter in the first position.

In Example 38, the subject matter of any one or more of Examples 34-37 optionally include wherein a wall of the pocket formed by the ceiling clamp when in the first position is instead open when the ceiling clamp is in a second position, the wall when open exposes a mechanism that places the at least one note in the pocket.

In Example 39, the subject matter of Example 38 optionally includes wherein the mechanism that places the at least one note in the pocket is also a note picker to pick notes from the pocket.

In Example 40, the subject matter of any one or more of Examples 34-39 optionally include wherein: the lifter includes a spine along a proximal edge and a plurality of fingers extending outward perpendicularly from the proximal edge with distal ends of the fingers; and the pusher plate defines a plurality of openings that are equal in number and located according to the number and location of the plurality of fingers of the lifter such that the plurality of fingers fit and move within the number of voids when the pusher plate is moved between the lower and upper positions and when the lifter is raised and lowered.

In Example 41, the subject matter of any one or more of Examples 34-40 optionally include moving the shutter to an open position; and illuminating the pocket when the shutter is in the open position.

In Example 42, the subject matter of Example 41 optionally includes wherein moving the shutter to the open position includes rotating the pocket to an outwardly exposed position.

In Example 43, the subject matter of any one or more of Examples 34-42 optionally include wherein the method is performed by a self-service terminal (SST).

In Example 44, the subject matter of Example 43 optionally includes wherein the SST is an automated teller machine (ATM).

In Example 45, the subject matter of any one or more of Examples 34-44 optionally include wherein the at least one note is a currency note.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

The invention claimed is:

1. A method comprising:
receiving at least one note to dispense within a pocket formed by a shutter, a pusher plate, a ceiling clamp when lowered, and a lifter, wherein the lifter includes a spine along a proximal edge and a plurality of fingers extending outward perpendicularly from the proximal edge with distal ends of the plurality of fingers;

moving the pusher plate from an upper position to a lowered position to hold the at least one note between an upper surface of the pusher plate and a lower surface of the ceiling clamp; and raising the lifter from lowered position to a raised position thereby lifting the at least one note to expose at least a portion of the at least one note to enable the at least one note to be manually removed from between the pusher plate and the ceiling clamp, the pusher plate defines a plurality of openings that are equal in number and located according to the number and location of the plurality of fingers of the lifter such that the plurality of fingers fit and move within the number of voids when the pusher plate is moved between the lower and upper positions and when the lifter is raised and lowered.

2. The method of claim 1, wherein:
the at least one note includes a first plurality of notes having a first denomination or a second plurality of notes having a second denomination, and
raising the lifter from the lowered position to the raised position includes raising the lifter a first distance for a first denomination or raising the lifter a second distance for the second denomination.

3. The method of claim 1, wherein raising the lifter from the lowered position to the raised position includes raising the lifter a predetermined distance that corresponds to a width of one of the at least one note.

4. The method of claim 1, further comprising lowering the ceiling clamp by rotating the ceiling clamp along an upper, proximal edge to move an opposite, distal edge to a lower position proximate to the lifter in the lowered position.

5. The method of claim 1, wherein a wall of the pocket formed by the ceiling clamp when in the lowered position is instead open when the ceiling clamp is in a raised position, the wall when open exposes a mechanism that places the at least one note in the pocket.

6. The method of claim 5, wherein the mechanism that places the at least one note in the pocket is also a note picker to pick notes from the pocket.

7. The method of claim 1, further comprising:
moving the shutter to an open position; and
illuminating the pocket when the shutter is in the open position.

8. The method of claim 7, wherein moving the shutter to the open position includes rotating the pocket to an outwardly exposed position.

9. The method of claim 1, wherein the method is performed by a self-service terminal (SST).

10. A self-service terminal comprising:
a note dispensing and picking mechanism configured to insert notes into a pocket and remove notes from the pocket;
a shutter forming an upper surface of the pocket that exposes an inside of the pocket outwardly from the self-service terminal when the shutter is in an open position;
a lifter positioned opposite the shutter and forming a lower surface of the pocket;
a pusher plate located in between the shutter and lifter forming a first surface of the pocket, the pusher plate is perpendicular to the shutter and lifter, the first surface is perpendicular to the lower surface of the pocket;
a ceiling clamp located opposite the pusher plate and in between the shutter and lifter forming a second surface of the pocket when in a closed position, the ceiling clamp exposing an inside of the pocket to the note dispensing and picking mechanism when in an open position, the ceiling clamp is perpendicular to the shutter and lifter when in the closed position, the second surface is perpendicular to the shutter when the ceiling clamp is in the closed position; and
a controller to control operation of the pocket, the controller when dispensing notes operable to cause the self-service terminal to perform actions comprising:
moving the ceiling clamp to the open position;
providing an output indicating the pocket is in the open position such that the note dispensing and picking mechanism can then dispense notes into the pocket;
moving the ceiling clamp to the closed position;
moving the pusher plate rearward as the notes are dispensed into the pocket such that secure notes present within the pocket are biased against the ceiling clamp;
raising the lifter from a lower position to an upper position thereby lifting notes present within the pocket between the pusher plate and the ceiling clamp; and
opening the shutter to expose the notes present within the pocket to an exterior of the pocket.

11. The self-service terminal of claim 10, wherein the actions further comprise further raising the lifter to expose a portion of the notes within the pocket from between the pusher plate and the ceiling clamp to allow manual removal of the notes within the pocket from therebetween.

12. The self-service terminal of claim 10, further comprising:
a light internal to the pocket;
a display device;
a camera positioned to capture a view of the inside of the pocket when the shutter is open; and
the actions further comprising:
illuminating the light upon opening the shutter,
capturing images with the camera upon opening and illuminating the light, and
providing the images for presentation on the display device.

13. The self-service terminal of claim 10, wherein the controller, when controlling operation of the pocket to receive tendered notes, causes the self-service terminal to perform actions comprising:
opening the shutter;
lowering the lifter prior to opening the shutter;
closing the shutter upon receipt of an indicating notes have been received;
moving the pusher plate forward to secure notes present within the pocket with a force biased against the ceiling clamp;
moving the ceiling clamp to the open position;
raising the lifter after closing the shutter and before moving the ceiling clamp to the open position; and
instructing the note dispensing and picking mechanism to pick notes from the pocket.

14. A self-service terminal comprising:
a controller for controlling a self-service terminal, the controller operable to cause the self-service terminal to perform actions comprising:
moving a ceiling clamp to an open position, providing an output indicating the ceiling clamp is in the open position such that a note dispensing and picking mechanism can then dispense notes into a pocket, moving the ceiling clamp to a closed position, moving a pusher plate rearward as the notes are dispensed into the pocket such that secure notes present within the pocket are biased against the ceiling clamp, raising the lifter from a lower position to an upper position thereby lifting notes present within the pocket between the pusher plate and the ceiling clamp; and opening a shutter to expose the notes present within the pocket to an exterior of the pocket;

a lifter that includes a spine along a proximal edge and a plurality of fingers extending outward perpendicularly from the proximal edge with distal ends of the fingers; and a pusher plate that defines a plurality of openings that are equal in number and located according to the number and location of the plurality of fingers of the lifter such that the plurality of fingers fit and move within the number of voids when the pusher plate is moved between the lower and upper positions and when the lifter is raised and lowered.

15. The self-service terminal of claim 14, wherein the actions further comprise further raising the lifter to expose a portion of the notes present within the pocket from between the pusher plate and the ceiling clamp to allow manual removal of the notes within the pocket from therebetween.

16. The self-service terminal of claim 14, wherein the actions further comprise illuminating a light located within the pocket upon opening the shutter.

17. The self-service terminal of claim 16, wherein the actions further comprise:

capturing images with a camera upon opening and illuminating the light, and providing the images for presentation on a display device.

18. The self-service terminal of claim 14, wherein the controller, when controlling operation of the self-service terminal to receive tendered notes, causes the self-service terminal to perform actions comprising:

opening the shutter;

closing the shutter upon receipt of an indicating notes have been received;

moving the pusher plate forward to secure notes present within the pocket against the ceiling clamp;

moving the ceiling clamp to the open position; and instructing the note dispensing and picking mechanism to pick notes from the pocket.

19. The self-service terminal of claim 18, wherein the controller, when controlling operation of the pocket to receive tendered notes, causes the self-service terminal to perform actions further comprising:

lowering the lifter prior to opening the shutter; and raising the lifter after closing the shutter and before moving the ceiling clamp to the open position.

20. A method comprising:

receiving at least one note to dispense within a pocket formed by a shutter, a pusher plate, a ceiling clamp when in a first position, and a lifter;

moving the pusher plate from a first position to a second position to hold the at least one note between a first surface of the pusher plate and a first surface of the ceiling clamp; and raising the lifter from a first position to a second position thereby translating the at least one note to expose at least a portion of the at least one note to enable the at least one note to be manually removed from between the pusher plate and the ceiling clamp, wherein:

the lifter includes a spine along a proximal edge and a plurality of fingers extending outward perpendicularly from the proximal edge with distal ends of the fingers; and the pusher plate defines a plurality of openings that are equal in number and located according to the number and location of the plurality of fingers of the lifter such that the plurality of fingers fit and move within the number of voids when the pusher plate is moved between the lower and upper positions and when the lifter is raised and lowered.

21. The method of claim 20, wherein:

the at least one note includes a first plurality of notes having a first denomination or a second plurality of notes having a second denomination, and raising the lifter from the first position to the second position includes raising the lifter a first distance for a first denomination or raising the lifter a second distance for the second denomination.

22. The method of claim 20, wherein raising the lifter from the first position to the second position includes raising the lifter a predetermined distance that corresponds to a width of one of the at least one note.

23. The method of claim 20, further comprising moving the ceiling clamp by rotating the ceiling clamp along a proximal edge to move an opposite, distal edge to a second position proximate to the lifter in the first position, wherein a wall of the pocket formed by the ceiling clamp when in the first position is instead open when the ceiling clamp is in a second position, the wall when open exposes a mechanism that places the at least one note in the pocket, wherein the mechanism that places the at least one note in the pocket is also a note picker to pick notes from the pocket.

* * * * *